United States Patent [19]
Dawson

[11] 3,796,503

[45] Mar. 12, 1974

[54] BELT CONVEYORS

[75] Inventor: Gordon Bertram Dawson, Worcester, England

[73] Assignee: Dowty Meco, Limited, Worcester, England

[22] Filed: July 19, 1971

[21] Appl. No.: 163,874

[30] Foreign Application Priority Data
July 30, 1970   Great Britain............... 36899/70

[52] U.S. Cl........ 403/353, 287/103 A, 198/192 R, 403/379
[51] Int. Cl............................................. F16b 1/00
[58] Field of Search........... 198/204, 192 R, 192 A; 287/108, 111, 118, 53.5, 189.36 R, 103 A; 211/177, 182; 248/223, 165; 29/428; 20/92.4

[56] References Cited
UNITED STATES PATENTS

| | | | |
|---|---|---|---|
| 3,200,940 | 8/1965 | Higgins | 198/192 |
| 2,983,352 | 5/1961 | De Flora et al. | 193/37 |
| 3,295,665 | 1/1967 | Bitzer | 192/192 |
| 3,126,090 | 3/1964 | Bitzer | 198/192 |
| 1,276,724 | 8/1918 | Cowley | 198/204 |
| 2,781,124 | 2/1957 | Troller | 198/192 |
| 3,586,142 | 6/1971 | Inwood et al. | 193/37 |
| 2,768,642 | 10/1956 | Sherman | 287/103 A |
| 2,530,588 | 11/1950 | Talboys | 287/189.36 R |
| 3,523,613 | 8/1970 | Konstant | 211/182 |
| 3,200,940 | 8/1965 | Higgins | 198/192 |
| 2,700,563 | 1/1955 | Krucker | 287/108 |

FOREIGN PATENTS OR APPLICATIONS
646,819   11/1928   France.................... 287/103 A Primary Examiner—Jordan Franklin
Assistant Examiner—Conrad L. Berman
Attorney, Agent, or Firm—Young & Thompson

[57] ABSTRACT

A belt conveyor having a pair of parallel elongate members carried by a number of support members, known as "stools", disposed at spaced intervals along the length of the elongate members and roller assemblies supported at spaced intervals between the elongate members to carry the movable belt, wherein each elongate member comprises a plurality of stringers in end to end arrangement and each stool includes means to support a stringer or stringers comprising a channel section member having two parallel sides and a base to receive the stringer between the parallel sides, pins and hole means operative in a loosely fitting manner between the stringer and the channel section member such that the stringer may enter the channel section member between the sides thereof to cause engagement of the pin and hole engagement means to locate the stringer in the endwise sense in the channel section member and locking means engageable between the stringer and the channel section member at least partly by angular movement of the stringer about a longitudinal axis relatively to the channel section member.

12 Claims, 7 Drawing Figures

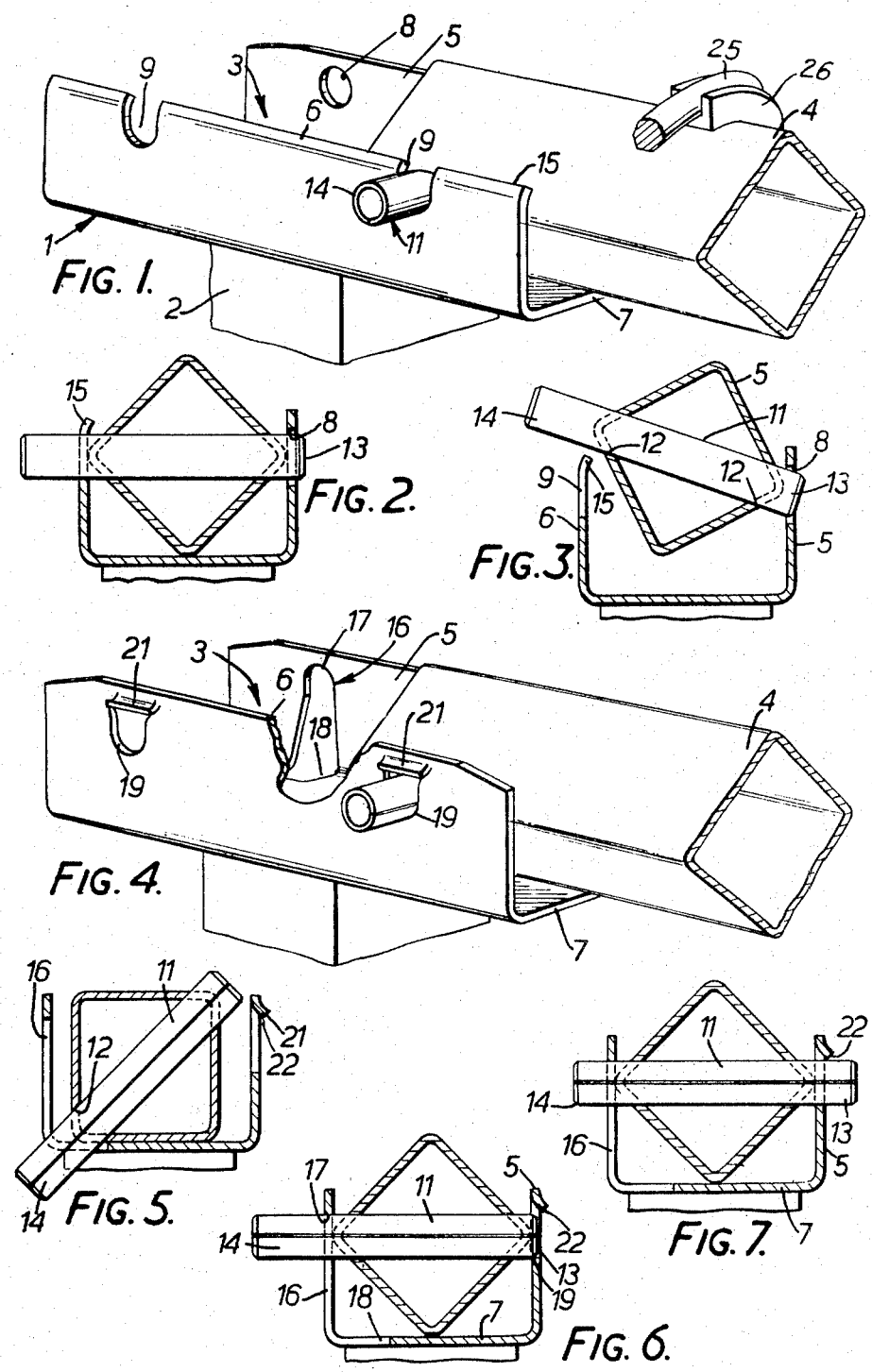

BELT CONVEYORS

This invention relates to belt conveyors and more particularly to the kind of belt conveyor which comprises a pair of parallel elongate members carried by a number of support members, known as stools, disposed at spaced intervals along the length of the elongate members and roller assemblies supported at spaced intervals between the elongate members to carry the movable belt. Each elongate member is comprised by a number of beams, known as stringers, arranged in end to end relation. Each stringer may be of any well known form which combines light weight and strength. Some of the stools may be located at the joints between stringers to perform the dual function of stringer support and securing adjacent stringers together. Such a conveyor will be referred to in this specification as a conveyor of the kind referred to.

The object of the present invention is to provide a conveyor of the kind referred to in which the assembly of the stools and elongate members involves only simple manual work requiring the use of the minimum tools.

The present invention comprises a stool and a stringer for use in a conveyor of the kind referred to, the stool including two substantially parallel sides and a base arranged as a channel section member, an elongate stringer adapted to enter between the sides of the channel section member to bear against the base by movement transverse to its length, a pair of projections on the stringer extending from opposite sides thereof, and a pair of holes one in one side and the other in the other side of the channel section member and so arranged so that during entry of the stringer transversely of its length into the channel section member, one projection engages in one hole and angular movement of the stringer about its length engages the other projection in the other hole.

Two embodiments of the invention will now be described with reference to the accompanying drawings, in which, FIG. 1 is a perspective view of the first embodiment of stool and stringer, FIG. 2 is a cross-section through the stringer in its locked position within the stool, FIG. 3 is a cross-section through the stringer in its partly inserted position within the stool, FIG. 4 is a perspective view of the second embodiment of stool and stringer, and FIGS. 5, 6 and 7 are cross-sections through the stringer showing differing positions of the stringer during its insertion into the stool.

Reference is made initially to FIGS. 1, 2 and 3. The stool 1 basically comprises a leg 2 of hollow box-section suitably adapted for mounting on the ground in the desired position and a channel-section member 3 secured by welding to the upper end of the leg. The end portion 4 of one stringer is shown inserted in the channel-section member. The channel-section member includes a pair of sides 5 and 6 which extend vertically upwards from a flat base 7. The sides are parallel and the side 5 is slightly higher than the side 6. The channel-section member 3 is intended for securing to the adjacent end portions of two stringers in end to end relation. For this purpose the side 5 is provided with a pair of circular holes 8 and the side 6 is provided with a pair of upwardly opening slots 9 each of whose positions correspond with a hole 8.

The stringer is of tubular form being square in section and the end portions 4 has a single cross pin 11 fixedly secured therein in a diagonally extending position. The pin 11 may be of the kind known as a roll-pin which comprises a piece of spring sheet metal rolled into a tube. This pin is inserted in holes 12 formed in the end portion 4 which are a close fit on the pin and cause elastic compression of the pin when it is driven into position. When in position the pin is strongly located against movement within the end portion.

The conveyor when erected comprises two parallel elongate members each of which is formed by a plurality of stringers arranged in end to end arrangement. Each pair of adjacent stringer ends is arranged to be supported by a stool carrying a channel-section member. Between the elongate members a plurality of roller assemblies are mounted, these roller assemblies carrying the endless belt. The roller assemblies in this instance are supported by hooks of which one is shown at 25 extending over the tops of the stringers and the weight of any material conveyed by the belt which reacts on the rollers will exert a twisting moment on the stringers. As shown in FIGS. 2 and 3 this twisting moment acts in an anti-clockwise sense. Each hook is carried in a saddle member 26 suitably bolted to the stringer.

In assembling the conveyor, one operation comprises the assembly of the stringer end portions into the stools. For this purpose the stringer end portion is placed in position between the sides 5 and 6 of the channel-section member, one end 13 of pin 11 being inserted in a hole 8. The hole is substantially larger than the pin permitting substantial angular movement of the pin relative to the channel-section member. The pin end 13 and the hole 8 form a loose pin-and-hole means. The stringer is then rotated angularly relatively to the stool about the fulcrum formed by the pin end 13 located in hole 8 until the opposite end 14 of pin 11 enters the slot 9 of the side 6. The diagonal dimension of the stringer 4 is arranged to be very slightly greater than the spacing between the two sides 5 and 6. Also the upper edge 15 of the side 6 is arranged with a slight inward bend. Thus in moving from the FIG. 3 to the FIG. 2 position the sides 5 and 6 are moved apart slightly as the diagonal of the stringer end engages the edge 15 of side 6. When the stringer end is fully in position as in FIG. 2, the edge 15 acts as a retainer on the diagonal of this stringer end tending to restrain angular movement of the stringer. The anti-clockwise moment applied to the stringer by the roller assemblies through hooks 25 will tend to move the pin 11 also in an anti-clockwise sense which in turn will press the pin against the base of the slot 9 and against the upper edge of the hole 8. The twisting moment on the stringer thus tends to hold it in position in the channel-section member.

For the removal of the stringer from the channel-section member a clockwise twist is first applied to the stringer to take it from the FIG. 2 to the FIG. 3 position. The stringer may then be moved away from the channel-section member in a direction which moves the pin end 13 out of engagement with the hole 8.

Reference is now made to the embodiment shown in FIGS. 4 to 7 and similar reference numerals will refer to similar parts which occur also in FIGS. 1 to 3. The channel-section member 3 secured to the upper edge of the leg 2 includes a pair of vertical sides 5 and 6 connected by a base 7. In this instance the sides 5 and 6 are both of the same height. The stringer end 4 is again fitted with a diagonally extending roll-pin 11. Within the side 5 a pair of slots 16 are formed which generally speaking are the equivalent of the holes 8 in FIG. 1 except for the fact that the holes 16 are considerably elongated. As seen in FIG. 4, the hole 16 is narrow at its upper part 17 and widens as it extends downwardly to its lower portion 18 located slightly within the base member 7. Within the side 6 a pair of holes 19 are provided which again are generally equivalent to the open-ended slots 9 of FIG. 1. The main difference, however, is that the holes 19 do not open to the upper edge of the side 6. The upper edge of each of the holes 19 is formed by an outwardly and downwardly inclined portion 21 of the side 6 so arranged that the edge 22 of the portion 21 is displaced outwardly from the plane of the side 6 which contains the remainder of the hole 19.

When inserting a stringer end portion 4 into a channel-section member of FIG. 4, the first position is shown at FIG. 5 in which the stringer with one face engaging against the base 7 is so arranged that the end portion 14 of pin 11 passes through the lower edge 18 of the slot. The stringer end 4 is then moved angularly in a clockwise sense from the FIG. 5 to the FIG. 6 position. During this movement the pin end portion 14 moves up through the tapering hole 16 to the narrow upper edge 17 thereof, at which position the holes 12 within the end portion 4 are accurately aligned with the corresponding hole 19 in the side 5. By the use of a hammer the pin 11 is driven from the left to the right by a small amount as seen in FIGS. 6 and 7 so that the end portion 13 of pin 11 passes under the edge 22 defining the upper part of the hole 19.

The roller assemblies supported by the stringer will produce a twisting moment thereon as described with reference to FIG. 1, but the engagement of the pin 11 in the holes 16 and 19 together with the engagement of one corner of the end portion 4 of the stringer against the base 7 will ensure that the stringer will resist twisting movement in either direction.

In order to remove the stringer end portion 4 from the channel-section member 3, a hammer is used on the end portion 13 of pin 11 to drive it inwardly to the position shown in FIG. 6 in which the end of the pin is clear of the upper edge 22 of the hole 19 but is still capable of engagement with the lower edge. Angular movement of the stringer from the position of FIG. 6 to the position of FIG. 5 can now take place and the end portion 13 of the pin 11 will clear the upper edge 22 of the hole. From the FIG. 5 position the stringer can be lifted out of the channel-section member.

Whilst in the described embodiments the pin or pins are secured in the ends of the stringers it is equally within the scope of the present invention for the pins to be located in the channel-section members of the stools, the co-operating holes being formed in the stringer end portions.

I claim:

1. A stool and a stringer for use in a conveyor, the stool including two substantially parallel sides and a base connected to said sides forming a channel section member, an elongated stringer of uniform cross-section located between the sides of the channel section member and having a maximum cross-section dimension slightly greater than the space between said parallel sides, said elongated stringer bearing against the base by movement transverse to its length, a pair of projections on the stringer extending from opposite sides thereof, and a pair of first and second holes, the first hole being in one side and the other in the other side of the channel section member, said first hole being spaced below the top edge of one side of said channel section member and the second hole forming an opening in the other of said sides of said channel section member, one projection on one side of said stringer being received in said first hole and the other projection being received in said second hole by angular movement of the stringer about its longitudinal axis so that said stringer is located endwise in said channel member and locked in position therein.

2. A stool and stringer as claimed in claim 1 wherein the projections comprise the two ends of a pin frictionally secured transversely in the stringer.

3. A stool and stringer as claimed in claim 2 wherein the stringer cross-section is such that the stringer will fit closely between the two sides of the channel section member whereby transverse movement of the pin against friction after insertion of the stringer into the channel section member will lock the stringer against any substantial angular movement relative to the channel section member.

4. A stool and stringer as claimed in claim 3 wherein one hole is formed jointly in one side and in the base of the channel section member and is of tapering form from a wide part of the hole in the base to a narrower part of the hole in the side whereby entry of the stringer into the channel section member is such that one projection enters the part of the hole in the base, said angular movement of the stringer moving this projection to the narrower part of the hole in the side.

5. A stool and stringer as claimed in claim 4 wherein the other of said holes is formed in the other side of the channel section member opposite to the narrow part of the one hole to receive the other of said projections following said angular movement of the stringer.

6. A stool and stringer as claimed in claim 5 wherein a portion of the surface of the said other of the two sides adjacent to said other hole is inclined away from the said one side, the inclination being such as to facilitate entry of said other projection into the said other hole.

7. For use in a conveyor of the kind referred to, a stool including a channel section member for the reception of a stringer, the channel section member comprising a base and a pair of parallel sides extending from the base and integrally formed therewith, one hole formed through the base and one side, a part of the one hole in the one side tapering to a narrower width from the width of the part of the one hole in the base, and a second hole formed in the other side oppositely disposed to the said part of the one hole in the one side.

8. A channel section member as claimed in claim 7 wherein the portion of the other side adjacent to the second hole and remote from the base is inclined inwardly into the second hole from the surface of the said other side facing the said one side.

9. A channel section member as claimed in claim 8 including a further pair of holes similar to the first and second holes formed in the channel section member at positions spaced from the said first and second holes.

10. A stool and stringer as claimed in claim 1 wherein the said other of the spaced holes opens as a slot into the edge of one side remote from the base such that the said other projection may enter the slot following said angular movement of the stringer.

11. A stool and stringer as claimed in claim 10 wherein the portion of the side containing the other of the spaced holes and remote from the base is bent towards the said other side to assist in retaining the stringer in its engaged position.

12. A stool and stringer for use in a conveyor of the kind referred to, the stool including two substantially parallel sides and a base arranged as a channel section member, an elongate stringer of uniform cross-section having a maximum cross-section dimension slightly greater than the space between said parallel sides, a projection on the stringer, a hole in one side of the channel section member so arranged that during entry of the stringer transversally of its length into the channel section member the projection engages the hole and angular movement of the stringer about its length engages the stringer in between the said parallel sides and against the base of the channel section member and means forming part of the conveyor adapted to maintain a twisting movement on the stringer during use to maintain the stringer engaged in the channel section member.

* * * * *